US012598411B2

(12) United States Patent
Björkvald et al.

(10) Patent No.: US 12,598,411 B2
(45) Date of Patent: Apr. 7, 2026

(54) HEARING DEVICE COMPRISING A PARTITION

(71) Applicant: GN Audio A/S, Ballerup (DK)

(72) Inventors: Henrik Björkvald, Ballerup (DK); Lars Tuborg Jensen, Ballerup (DK); Lars Persson, Ballerup (DK); Dan Fiirgaard Schneefeldt, Ballerup (DK); Magnus Steijner, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 146 days.

(21) Appl. No.: 18/618,481

(22) Filed: Mar. 27, 2024

(65) Prior Publication Data

US 2024/0357275 A1 Oct. 24, 2024

(30) Foreign Application Priority Data

Apr. 24, 2023 (EP) .................................... 23169427

(51) Int. Cl.
*H04R 1/10* (2006.01)
*H04R 1/28* (2006.01)

(52) U.S. Cl.
CPC ......... *H04R 1/1083* (2013.01); *H04R 1/1016* (2013.01); *H04R 1/2803* (2013.01); *H04R 2420/07* (2013.01)

(58) Field of Classification Search
CPC .... H04R 1/1008; H04R 1/1033; H04R 1/105; H04R 1/1016; H04R 1/1075;
(Continued)

(56) References Cited

U.S. PATENT DOCUMENTS 8,208,674 B2 * 6/2012 Lyon .................... H04R 19/013
381/328
11,792,564 B2 * 10/2023 Kuipers ............... H04R 1/1016
381/328

(Continued)

FOREIGN PATENT DOCUMENTS

CN 112188336 A 1/2021

OTHER PUBLICATIONS

The extended European search report issued in European Application No. 23169427.4, dated Oct. 12, 2023.

*Primary Examiner* — Gerald Gauthier
(74) *Attorney, Agent, or Firm* — HSML P.C.

(57) ABSTRACT

Disclosed is a hearing device configured to be worn in an ear of a user, the hearing device comprising a housing; at least a first electrical component arranged inside the housing; a speaker arranged in the housing; a first opening provided in the housing, where the first opening is configured to provide passage from surroundings into the housing, wherein the first opening is an opening for the speaker and/or a vent opening; a partition arranged inside the housing; wherein the partition is configured to divide the housing into at least a first compartment and a second compartment, where the first opening is provided in the first compartment, where the speaker is arranged in the first compartment, and where the first electrical component is arranged inside the second compartment; wherein the partition is arranged to seal the second compartment from the first compartment; wherein the partition is configured to prevent water, liquids, sweat and/or moisture from passing from the first compartment into the second compartment.

15 Claims, 11 Drawing Sheets

(58) Field of Classification Search
CPC .... H04R 1/1083; H04R 1/2803; H04R 9/063; H04R 25/305; H04R 25/402; H04R 25/456; H04R 25/48; H04R 25/60; H04R 25/604; H04R 25/609; H04R 25/65; H04R 25/654; H04R 25/656; H04R 2201/10; H04R 2201/105; H04R 2225/025; H04R 2225/57; H04R 2420/07; H04R 7/06; H04R 19/013; H04R 25/50; H04R 25/606; H04R 25/652; B29C 43/32
USPC ...... 381/71.6, 317, 322, 323, 324, 328, 380, 381/396; 600/25
See application file for complete search history.

(56) References Cited

U.S. PATENT DOCUMENTS

2006/0153418 A1* 7/2006 Van Halteren ......... H04R 9/063 381/396
2007/0183613 A1* 8/2007 Juneau ................. H04R 25/656 381/328
2008/0118095 A1* 5/2008 Fletcher ............... H04R 25/654 381/328
2009/0092270 A1* 4/2009 Ho ......................... H04R 25/65 381/322
2009/0169039 A1* 7/2009 Rasmussen .......... H04R 25/652 381/328
2009/0310807 A1* 12/2009 van Halteren ......... H04R 25/60 381/328
2011/0069852 A1* 3/2011 Arndt ..................... H04R 25/48 381/328
2011/0235837 A1* 9/2011 Huttinger ............... H04R 25/65 381/328
2012/0053393 A1* 3/2012 Kaltenbacher ....... H04R 25/606 29/25.35
2012/0063622 A1* 3/2012 Bruckhoff ............ H04R 1/1016 381/328
2012/0219168 A1* 8/2012 Zhao ...................... H04R 25/60 381/328
2012/0257774 A1* 10/2012 Larsen ................. H04R 25/656 381/328
2013/0004004 A1* 1/2013 Zhao .................... H04R 25/656 381/328
2013/0083952 A1* 4/2013 Lederer ................ H04R 25/609 381/323
2013/0230199 A1* 9/2013 Stirnemann .......... H04R 25/402 381/322
2014/0050342 A1* 2/2014 Hau ..................... H04R 25/305 381/328
2014/0056453 A1* 2/2014 Olsen ................... H04R 25/652 381/328
2014/0153761 A1* 6/2014 Shennib ............... H04R 25/652 381/328
2014/0270221 A1* 9/2014 Taylor .................. H04R 1/1033 174/152 G
2015/0078603 A1* 3/2015 van Halteren ......... H04R 25/65 381/328
2015/0281861 A1* 10/2015 Karamuk ................ B29C 43/32 381/328
2017/0208398 A1* 7/2017 Ruppersberg ........ H04R 25/604
2018/0227685 A1* 8/2018 Huber .................... H04R 25/65
2023/0086864 A1* 3/2023 Møller ................. H04R 25/654 381/328
2023/0091575 A1* 3/2023 Koneru ................ H04R 1/1016 381/328
2023/0156409 A1* 5/2023 Moore ................... H04R 25/50 381/328
2023/0247340 A1* 8/2023 Lee ...................... H04R 1/1016 381/328
2023/0336930 A1* 10/2023 Probst .................. H04R 25/654
2024/0147162 A1* 5/2024 Zhang ....................... H04R 7/06
2024/0357275 A1* 10/2024 Björkvald ............ H04R 1/2803

* cited by examiner

102

104

106

108

HEARING DEVICE COMPRISING A PARTITION

FIELD

The present invention relates to hearing devices. More specifically, the disclosure relates to a hearing device configured to be worn in an ear of a user. The hearing device comprises a housing, at least a first electrical component arranged inside the housing, a speaker arranged in the housing, a first opening provided in the housing, where the first opening is configured to provide passage from surroundings into the housing, and the first opening is an opening for the speaker and/or a vent opening.

BACKGROUND

Traditional hearing devices, such as True Wireless Earbuds (TWS), of today may be equipped with various acoustical openings to create the optimum frequency response. State of the art hearing devices, e.g. earbuds, may be semi-open with several microphones to pick up speech through the air, densely packed printed circuit board assembly (PCBA), coin cell battery, speaker, and feedback microphone (FBM) for Active Noise Cancellation (ANC). In a semi open hearing device there are acoustical leaks between the exterior and the back cavity of the speaker. This is to allow for a well-balanced and controlled acoustical response. These leaks will however allow for moisture to reach the internal electrical components of the hearing device with heavy corrosion consequences. To avoid corrosion, all electrical components will need a water repellant coating. This is expensive and often unreliable, and it is impossible to perform quality control of such coating for leaks.

Thus, there is a need for an improved hearing device.

SUMMARY

Disclosed is a hearing device configured to be worn in an ear of a user. The hearing device comprises a housing. The hearing device comprises at least a first electrical component arranged inside the housing. The hearing device comprises a speaker arranged in the housing. The hearing device comprises a first opening provided in the housing. The first opening is configured to provide passage from surroundings into the housing. The first opening is an opening for the speaker and/or a vent opening. The hearing device comprises a partition arranged inside the housing. The partition is configured to divide the housing into at least a first compartment and a second compartment. The first opening is provided in the first compartment. The speaker is arranged in the first compartment. The first electrical component is arranged inside the second compartment. The partition is arranged to seal the second compartment from the first compartment. The partition is configured to prevent water, liquids, sweat and/or moisture from passing from the first compartment into the second compartment.

It is an advantage that a partition, e.g. a custom designed plastic part, is incorporated into the hearing device. The partition creates a well-defined and robust dry compartment in the hearing device, and it eliminates the expensive and unreliable coating of electrical hardware components.

It may have a super thin wall thicknesses, e.g. down to 0.23 mm, to avoid disrupting the architecture and small size of the hearing device.

It is an advantage that the partition of the hearing device provides or creates a barrier from wet to dry in the hearing device. Thereby, it is an advantage of the hearing device that it is more reliable in wet environments.

It is an advantage that the hearing device provides reduction of costly and unreliable coatings, because the partition may make the typical coating of electrical components in the hearing device redundant and needless.

It is an advantage that the partition and the hearing device greatly reduces the risk of battery leaks where acid flows from the battery to the users' ears.

It is an advantage of the hearing device that it provides a well-defined speaker back-volume, since this provides an improved sound to the user's ear.

The hearing device is configured to be worn in an ear of a user. The hearing device may be an earbud type of hearing device which is configured to be worn in an ear of the user, such as partly in the outer ear canal and partly resting at the concha of the ear. The hearing device may be a headset. The hearing device may be a hearing aid compensating for a hearing loss of the user. The hearing device may be a hearing device configured to be worn when the user is doing sports.

The hearing device comprises a housing. The housing may enclose the components inside the hearing device. An eargel, e.g. dome, may be attached to a speaker tower of the housing. The housing may be enclosed in a removable, soft, flexible silicone sheath.

The hearing device comprises at least a first electrical component arranged inside the housing. The first electrical component may e.g. be a battery, such as a rechargeable battery; an input transducer, such as a microphone; a printed circuit board assembly (PCBA); charging components for the battery, such as brass terminals, etc.

If the first electrical component is one of the above mentioned examples, then the hearing device may also comprise one or more of the other above mentioned examples as further electrical components.

The hearing device comprises a speaker arranged in the housing. The speaker may be an acoustical output transducer, a receiver, a loudspeaker etc. The speaker is configured to provide sound to the ear of the user. The speaker may be arranged in connection with a speaker tower of the housing of the hearing device.

The hearing device comprises a first opening provided in the housing. The first opening is configured to provide passage from surroundings into the housing. The first opening is an opening for the speaker. Alternatively and/or additionally, the first opening is a vent opening. There may be both an opening for the speaker and a vent opening in the housing. The passage from surroundings may allow for water, ear wax, cerumen, moisture, dust, skin flakes, tissue residues etc to enter the housing. The surroundings may be the outer ear of the user and ambient space.

The hearing device may comprise a push button which extends across a flat surface of the hearing device. The push button may be adjacent and align with edges the housing. The push button may have flat outer surface.

The push button may comprise a plunger. The plunger may be accommodated in a flexible sheath. The flexible sheath may be formed as an integral part of a second shell, e.g., in a 2K injection moulding process. The plunger when pushed downwards, may interact with a printed circuit board arranged in a second compartment. The flexible sheath, the second shell, and the partition may form the second compartment.

A through-hole for accommodating the plunger/push button may be provided in the second compartment and/or in a second shell of the housing.

The hearing device may comprise an eargel, e.g. dome, which is attached to a speaker tower of the housing. The eargel may be configured to extend into the outer ear channel of the user's ear.

The housing may be enclosed in a removable, soft, flexible silicone sheath.

The hearing device may comprise a sensor module. The sensor module may be an infra red (IR) sensor module. The sensor module may be for sensing one or more physiological parameters of a user wearing the hearing device, e.g., for sensing a heart rate in the user's ear. The sensor module may be for sensing whether the hearing device is worn or not. The sensor module may be arranged adjacent the charging components and/or the third vent opening.

The first opening for e.g. the speaker, may be arranged in a speaker tower. A first shell may comprise an additional first opening configured to provide passage from surroundings into the housing. The additional first opening may split into a long vent and a short vent. The long vent and the short vent may provide passage between the back cavity of the speaker and surroundings. The long vent may be formed by a groove in the first shell and a cover piece attached to the first shell. Both the short vent and the long vent may be covered by a mesh to prevent the ingress of dirt and liquid from the surroundings into the housing. Only a mesh may be covering the short vent.

A mutual vent may be formed in the first shell. The mutual vent may connect the front cavity of the speaker with the back cavity of the speaker. A mesh may be arranged covering the mutual vent to prevent dirt and liquid from passing between the front cavity and the back cavity.

The meshes may be acoustic meshes. The meshes may be meshes for preventing dirt and other contaminants from affecting the performance of the microphones. The first opening may be covered by a mesh to prevent contaminants, such as liquids and dust, from entering the first compartment.

The hearing device comprises a partition arranged inside the housing. The partition may be a barrier. The partition may be a divider.

The partition is configured to divide the housing into at least a first compartment and a second compartment. The first compartment may be formed by a part of the housing and a part of a surface of the partition. The second compartment may be formed by another part of the housing and a part of a surface of the partition, such as the other side of the surface of the partition relative to first compartment. There may be no passage between the first compartment and the second compartment. The first compartment and the second compartment may be two separate volumes, chambers, areas, cavities etc. Even though the first compartment and the second compartment may be two separate chambers, electrical connections may still run between the first compartment and the second compartment. In an example hearing device, a flex PCB electrically connects one or more electrical components in the first compartment with one or more electrical components in the second compartment. The passage of the flex PCB between the first compartment and the second compartment may be sealed by an adhesive, such as glue, to prevent water, liquids, sweat and/or moisture from entering the second compartment from the first compartment and vice versa.

The first opening is provided in the first compartment. The speaker is arranged in the first compartment. Thus, there is a risk of water, liquids, sweat and/or moisture entering into the first compartment from the surroundings. The first compartment may thus be viewed as a wet area. The second compartment may thus be viewed as a dry area.

The first electrical component is arranged inside the second compartment. Thus, the first electrical component in the second compartment is separated from the first compartment, and thereby separated from the first opening.

The partition is arranged to seal the second compartment from the first compartment. To seal may mean to close or to protect. Thus, the second compartment may be sealed, closed, protected from the first compartment.

The partition is configured to prevent water, liquids, sweat and/or moisture from passing from the first compartment into the second compartment. The partition may also be configured to prevent dust, cerumen, hair etc passing from the first compartment into the second compartment.

It is an advantage that the partition prevents water, liquids, sweat and/or moisture from passing from the first compartment into the second compartment because thereby corrosion of electrical hardware components can be avoided, and thereby the need to encapsulate components can be avoided.

It is an advantage of the partition that it may be avoided to have to encapsulate electrical components in the housing, such as the first electrical component in the second compartment. It is an advantage to avoid encapsulation, because the disadvantages of encapsulating electrical components are that it is expensive and difficult to encapsulate, and that it is difficult to obtain a good quality of coating, and it is difficult to encapsulate because masking may have to be done at battery contacts before encapsulation/coating can be done.

In some embodiments, the first compartment comprises a front cavity of the speaker and a back cavity of the speaker, and wherein the partition is configured to seal the first electrical component from the back cavity of the speaker. Thus, the back cavity of the speaker may be arranged adjacent to the partition. The front cavity of the speaker may be arranged adjacent to a speaker tower of the hearing device. The speaker may be arranged between the front cavity and the back cavity.

The partition may be configured to fluidly seal the first electrical component from the back cavity of the speaker.

In some embodiments, the partition is configured to prevent liquids from passing from the first compartment into the second compartment thereby preventing corrosion in the second compartment, and wherein the partition is configured to prevent battery acid leaks from a battery in the second compartment from passing from the second compartment into the first compartment. When battery acid leaks from a battery in the second compartment is prevented from passing from the second compartment into the first compartment, then the acid leaks is prevented from reaching the user's ear and skin. The battery may be the first electrical component.

In some embodiments, the partition is configured to control the size of the back cavity of the speaker in the first compartment, whereby improved sound is obtained in the hearing device. The improved sound may be an improved acoustical response. Because of the arrangement of the partition, the size of the back cavity of the speaker may be controlled and adjusted, e.g. reduced, which may improve the sound for the user, because a smaller back cavity may improve the sound. The back cavity may have a volume in a range from about 250 mm3 to about 500 mm3, such as a range from about 300 mm3 to about 450 mm3, such as a range from about 350 mm3 to about 400 mm3, such as about 375 mm3.

In some embodiments, the partition is configured to control the shape of the back cavity of the speaker in the first compartment, whereby improved sound is obtained in the hearing device. The improved sound may be an improved acoustical response. Because of the arrangement of the partition, the shape of the back cavity of the speaker may be controlled and adjusted, e.g. made more oblong or made more rectangular, which may improve the sound for the user, because a differently shaped back cavity may improve the sound.

In some embodiments, the partition is shaped to at least partly accommodate at least a part of an outer surface of the first electrical component. The partition may be formed with a shape which is complementary to a shape of the first electrical component. Thus, the partition may accommodate, match, follow an outer surface of the first electrical component, such as an outer surface of the battery in the second compartment. It is an advantage because hereby the hearing device can be as small as possible because, and the first electrical component, e.g. battery, is better fixed in the housing, and thereby does not rattle in the housing. The partition may be formed with one or more snap connectors configured to receive the first electrical component and/or additional electrical components. The snap connectors may facilitate correct aligning of electrical components during assembly and reduce unwanted movement of the electrical components.

In some embodiments, the hearing device comprises a second electrical component, and wherein the second electrical component is arranged inside the second compartment, and wherein the partition is shaped to at least partly accommodate at least a part of an outer surface of the second electrical component. Thus, the partition may accommodate, match, follow an outer surface of the second electrical component, such as an outer surface of the microphone in the second compartment. It is an advantage because hereby the hearing device can be as small as possible because, and the second electrical component, e.g. microphone, is better fixed in the housing, and thereby does not rattle in the housing.

In some embodiments, the partition is shaped to comprise a recess to at least partly accommodate at least a part of an outer surface of the first electrical component. For example, the first electrical component may be a battery, and then the battery will be arranged in the recess of the partition. There may be more recesses in the partition, such as an additional recess for the microphone.

The recess may be shaped to at least partly accommodate at least a part of an outer surface of the first electrical component.

The hearing device may also comprise charging components for the battery, and these charging components may be arranged in the second compartment, thus the partition may also comprise a recess to at least partly accommodate the charging components. This is an advantage as it further reduces the risk of corrosion in the hearing device.

In some embodiments, an outer perimeter of the partition follows an inner perimeter of the housing, the inner perimeter of the housing being where the housing is divided into the first compartment and the second compartment. The outer perimeter may be an outer edge. The inner perimeter may be an inner edge. The outer perimeter of the partition may follow or align with the inner perimeter of the housing. The housing may comprise a first shell and a second shell, and the inner perimeter of the housing may be an edge of the first shell.

Alternatively and/or additionally, the partition may form a part of the housing, e.g. if laser welding is used for assembling the hearing device.

In some embodiments, a thickness of the partition is in the range from 0.1 mm to 1.0 mm, such as in the range from 0.15 mm to 0.40 mm, such as in the range from 0.20 mm to 0.30 mm, such as 0.23 mm. This thickness may be in a direction perpendicular to the perimeter of the partition. The partition may have a substantially uniform thickness. The partition may comprise one or more edge portions with a first thickness and one or more center portions with a second thickness, the second thickness may be in the range from 0.1 mm to 1.0 mm, such as in the range from 0.15 mm to 0.40 mm, such as in the range from 0.20 mm to 0.30 mm, such as 0.23 mm, and the first thickness may be larger than the second thickness.

In some embodiments, the partition is made from a polymer material. The polymer material may for example be a polycarbonate material, such as polycarbonate/acrylonitrile butadiene styrene (PC-ABS). Alternatively and/or additionally, the partition may be made from a metal material. The partition may be produced by moulding, such as injection moulding.

The partition may be flexible and/or rigid. The partition may comprise parts which are flexible and other parts which are rigid. The partition may comprise holes for receiving adhesive, such as glue, for fixing electrical components to the partition and/or for fixing the partition to the housing in an assembly method for assembling the hearing device. In case of using e.g. glue for fixation, there may be no need for a flexible part in the partition to take up tolerances.

Assembly methods may include applying adhesive for fixing parts together, and/or laser welding and/or a mechanical seal.

During assembly, the partition may receive the battery and/or other electrical components to thereby fixate them during assembly and usage, e.g., the battery may be received in a complementary shaped recess in the partition and glued to the bottom of the recess. Alternatively, the battery may be fixated via a friction fit or similar.

The printed circuit board (PCB) may be fixated to the partition by snaps integrally formed with the partition.

In some embodiments, the housing comprises at least a first shell and a second shell, wherein the first compartment is defined by the first shell and the partition, and wherein the second compartment is defined by the second shell and the partition.

The first shell may define the first compartment. The second shell may define the second compartment. The first shell may form a part of the first compartment. The second shell may form a part of the second compartment. The housing may comprise a first housing part and a second housing part, wherein the first housing part and the second housing part may be arranged adjacent to each other, with the partition in between. The first housing part and the second housing part may be connected by snap fitting and an adhesive, and/or may be connected by an outer shell, a cover, a sheath etc.

In some embodiments, the first shell, the second shell and the partition are configured to be assembled by snap fitting and an adhesive. In some embodiments, the edges of the first shell, the second shell and the partition are configured to be assembled by snap fitting and an adhesive. The snap fitting may be performed as an intermediate fixation followed by applying adhesive for permanent fixation. For example, the partition may be snapped into the housing, or into the first and/or second shell, or into a back cover, etc, and adhesive may then be dispensed into a groove defined by the housing, shell, back cover etc and the partition. A front cover may then be adhered to the back cover and the partition. The adhesive may be a glue, such as epoxy glue, and/or the adhesive may be a tape, such as a double-sided tape. In some embodiments, the first shell, the second shell and the partition are configured to be assembled by mechanical assembly, such as snap fitting.

The partition may comprise one or more adhesive cavities for receiving an adhesive for connecting the first electrical component to the partition. The first electrical component may be connected to the partition via glue being filled into the adhesive cavities.

In some embodiments, the hearing device comprises a second opening, wherein the second opening is provided in the second compartment, and wherein the second opening is a microphone opening, and wherein the first electrical component is fluidly sealed from the second opening. It is an advantage that the first electrical component is fluidly sealed from also the second opening being a microphone opening, because this will prevent fluids, such as water, moisture, ear wax etc to enter the first electrical component and cause corrosion. Gaskets may be arranged in connection with the second openings to thereby seal the first electrical component from the second openings.

In some embodiments, the first electrical component is a battery, a microphone, and/or a printed circuit board. It is an advantage that the battery, microphone or printed circuit board is protected from fluids, such as water, moisture, ear wax etc because this will protect this component from corrosion.

In some embodiments, the hearing device comprises a third electrical component, wherein the third electrical component is arranged inside the first compartment, and wherein the third electrical component is an in-the-ear microphone. An in-the-ear microphone is arranged in the ear of the user and is also known as a feedback microphone, and may be used for active noise cancellation etc. This the in-the-ear may be arranged in the same comportment, i.e. the first compartment as the speaker, and may be arranged close to the speaker.

According to an aspect, disclosed is a method of assembling the hearing device. The method may use laser welding for assembling the parts of the hearing device, however other assembly methods may be used, such as assembly using adhesive and/or assembly using snapfitting, mechanical fixation etc.

The method may comprise assembling the partition to the first shell, and then applying a clamping force.

The method may comprise keeping the clamping force and applying laser until the two parts, e.g. partition and first shell, have joined and touch at a so-called hard-hard interface.

The method may comprise assembling the second shell onto the partition, and then applying a clamping force.

The method may comprise keeping the clamping force and applying laser until the two parts, e.g. partition and second shell, have joined and touch at a so-called hard-hard interface.

In an embodiment, a hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprise in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

In an embodiment, the hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

The present invention relates to different aspects including the hearing device described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
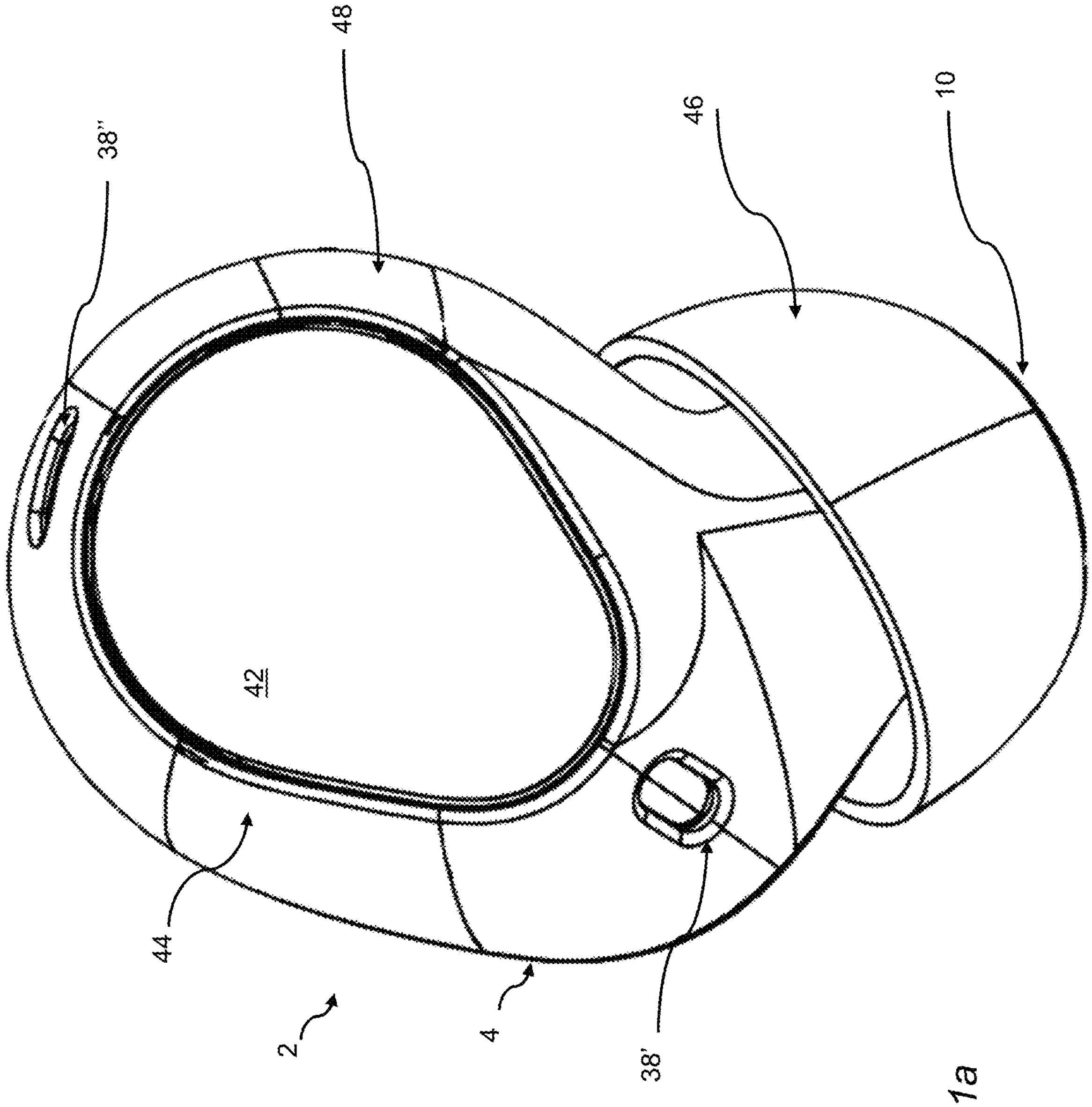
FIGS. 1*a* and 1*b* schematically illustrates an exemplary hearing device configured to be worn in an ear of a user.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1B:
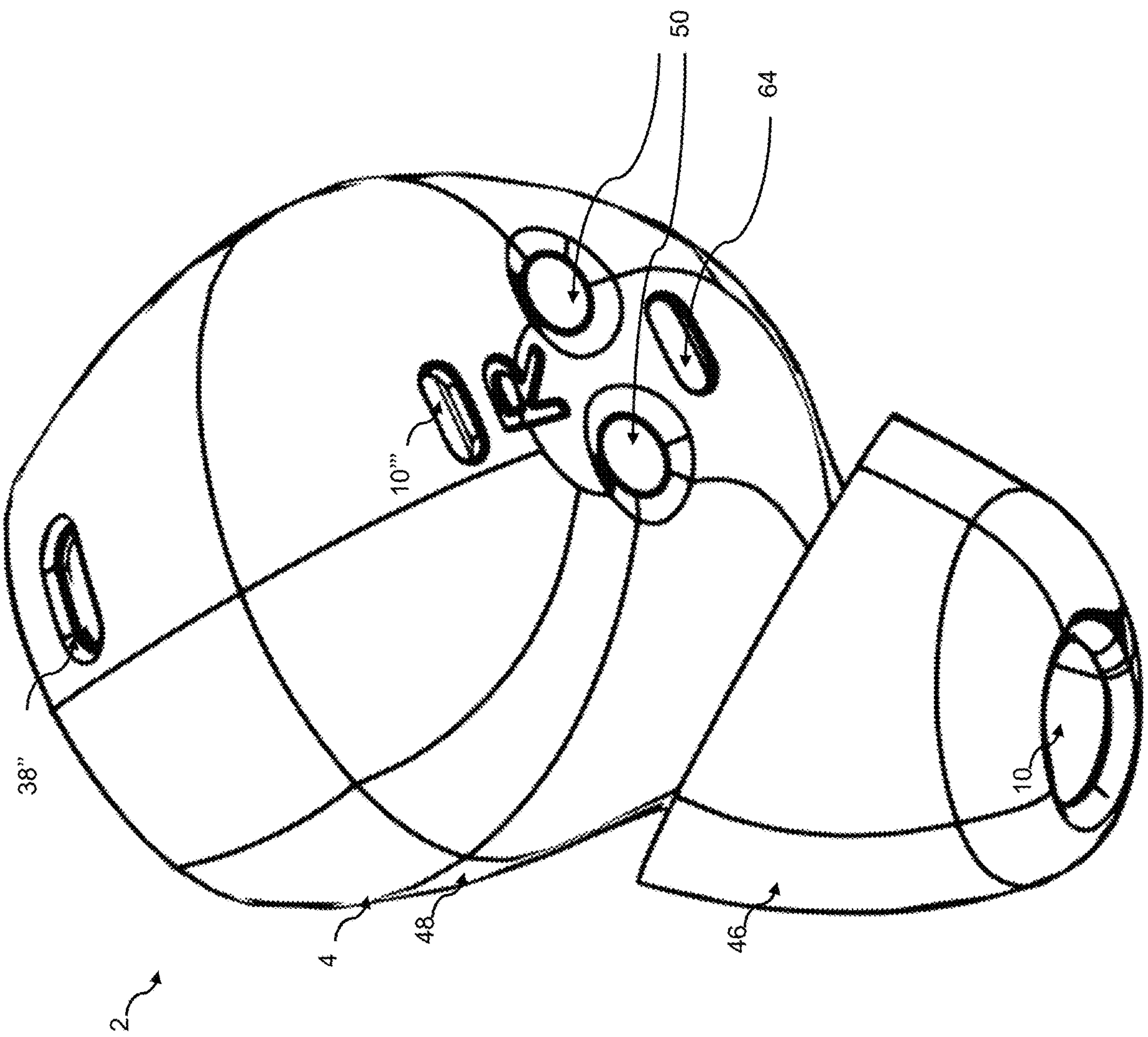

FIGS. 1*a* and 1*b* schematically illustrates an exemplary hearing device 2 configured to be worn in an ear of a user. The hearing device 2 comprises a housing 4. The hearing device 2 comprises a first opening 10, 10''' provided in the housing, where the first opening 10, 10''' is configured to provide passage from surroundings into the housing 4. The first opening 10 may be an opening 10 for a speaker (not shown) and/or a vent opening 10'''.

The shown hearing device 2 comprises two second openings 38', 38''. The second openings 38', 38'' being microphone openings for microphones (not shown) in the hearing device 2.

In FIGS. 1*a* and 1*b*, the hearing device is shown with two first openings 10, 10''', one first opening 10 being for the speaker, and the other first opening 10''' being a vent opening 10'''.

The first and/or second openings 10, 10''', 38', 38'' may be covered by meshes for reducing the amount of fluids, dust etc which enters the hearing device 2.

The hearing device comprises a push button 42 which extends across a flat surface of the hearing device 2. The push button 42 may be adjacent and align with edges 44 the housing 4. The push button may have a flat outer surface.

The hearing device 2 comprises an eargel 46, e.g. dome, which is attached to a speaker tower (not visible) of the housing 4. The eargel 46 is configured to extend into the outer ear channel of the user's ear.

The housing 4 may be enclosed in a removable, soft, flexible silicone sheath 48.

The hearing device 2 may comprise charging components 50 for a battery (not shown), such as brass terminals.

The hearing device 2 may comprise a sensor module 64. The sensor module may be arranged adjacent the charging components 50 and/or the vent opening 10'''.

Figure 1C:
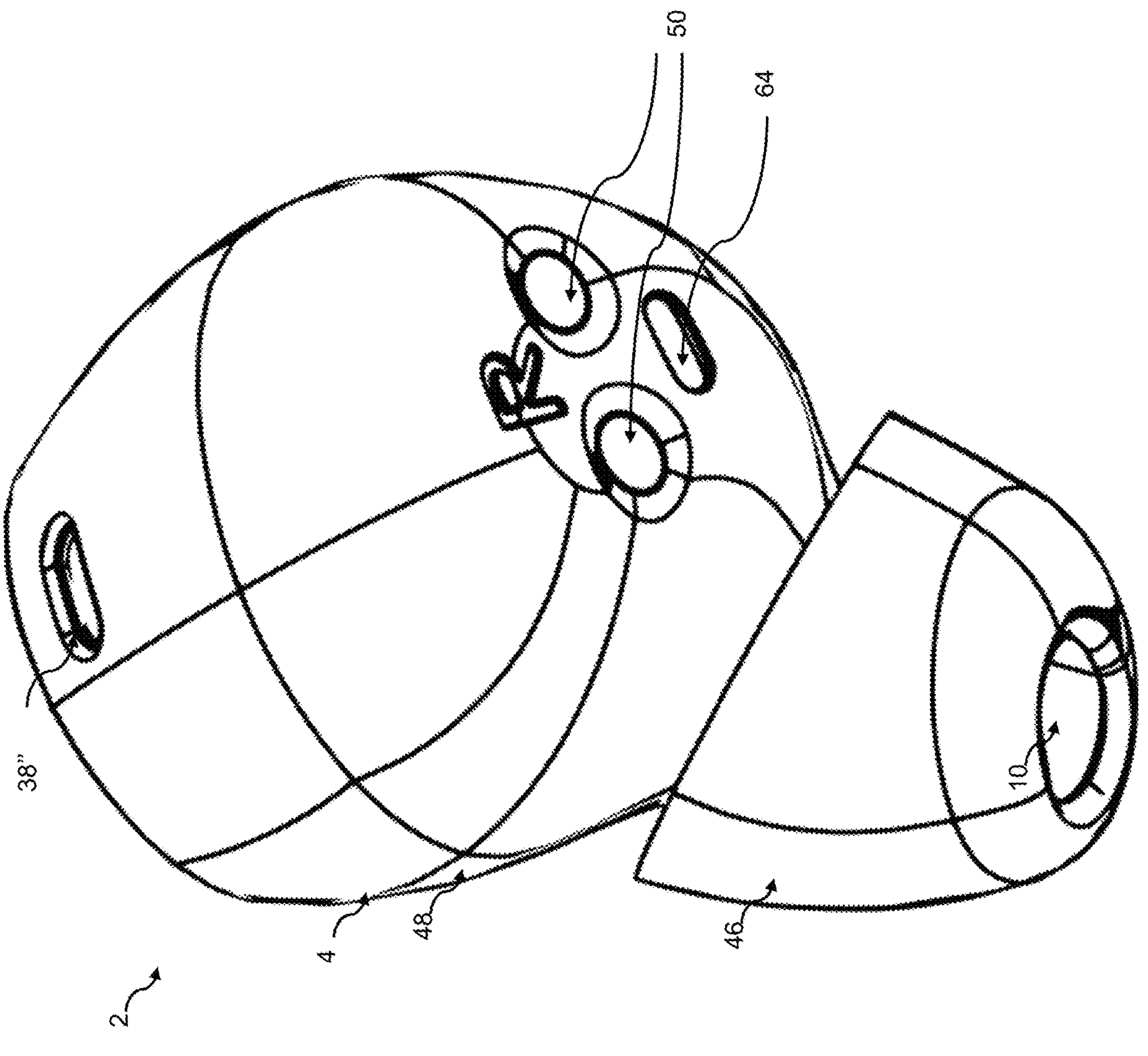
FIG. 1*c* schematically illustrates an exemplary hearing device configured to be worn in an ear of a user.

FIG. 1*c* schematically illustrates an exemplary hearing device 2 configured to be worn in an ear of a user. The hearing device 2 differs from the hearing devices shown on FIG. 1*a* and FIG. 1*b* by not having a vent opening 10''' as shown on FIG. 1*b*. Otherwise, the hearing device 2 shown in FIG. 1*c* is substantially identical to the hearing devices.

Figure 2:
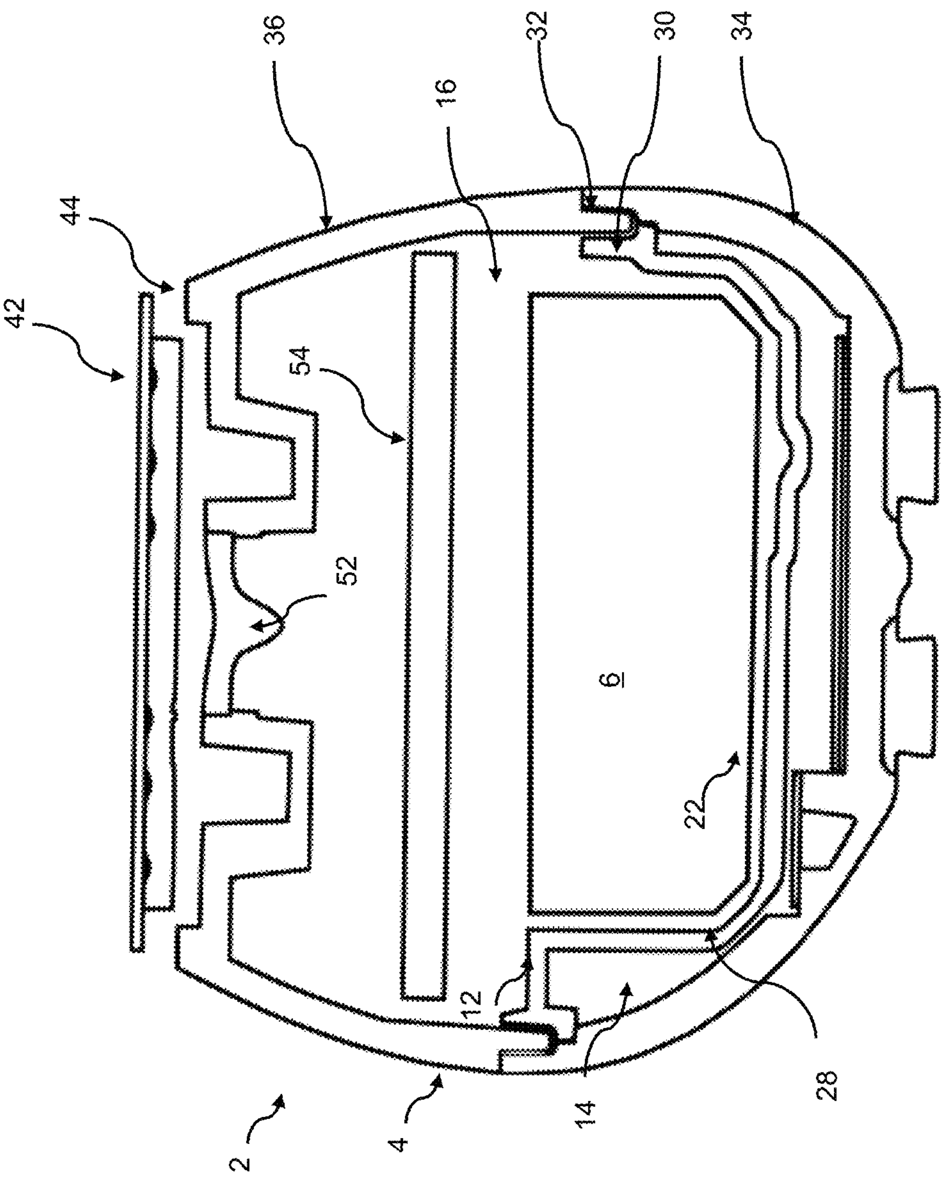
FIG. 2 schematically illustrates a cross section of an exemplary hearing device.

FIG. 2 schematically illustrates a cross section of an exemplary hearing device 2. The hearing device 2 comprises a housing 4. The hearing device comprises at least a first electrical component 6 arranged inside the housing. In FIG. 2, the first electrical component 6 is shown as a battery. The hearing device comprises a partition 12 arranged inside the housing 4. The partition is configured to divide the housing 4 into at least a first compartment 14 and a second compartment 16. The first electrical component 6 is arranged inside the second compartment 16. The partition 12 is arranged to seal the second compartment 16 from the first compartment 14. The partition 12 is configured to prevent water, liquids, sweat and/or moisture from passing from the first compartment 14 into the second compartment 16.

The partition 12 is configured to prevent liquids from passing from the first compartment 14 into the second compartment 16 thereby preventing corrosion in the second compartment 16. The partition 12 is configured to prevent battery acid leaks from the battery, being the first electrical component 6, in the second compartment 16 from passing from the second compartment 16 into the first compartment 14.

The partition 12 is shaped to at least partly accommodate at least a part of an outer surface 22 of the first electrical component 6 (e.g. battery).

The partition is shaped to comprise a recess 28 to at least partly accommodate at least a part of an outer surface 22 of the first electrical component 6 (e.g. battery).

An outer perimeter 30 of the partition 12 follows an inner perimeter 32 of the housing 4, where the inner perimeter 32 of the housing 4 is where the housing 4 is divided into the first compartment 14 and the second compartment 16.

The housing 4 comprises at least a first shell 34 and a second shell 36, wherein the first compartment 14 is defined by the first shell 34 and the partition 12, and wherein the second compartment 16 is defined by the second shell 36 and the partition 12.

The first shell 34, the second shell 36 and the partition 12 are configured to be assembled by snap fitting and an adhesive, where the snap fitting and the adhesive may be at the outer perimeter 30 of the partition 12 and the inner perimeter 32 of the housing 4.

The hearing device 2 comprises a push button 42 which extends across a flat surface of the hearing device 2. The push button 42 may be adjacent and align with edges 44 the housing 4. The push button may have flat outer surface.

The push button 42 may comprise a plunger, not shown. The plunger may be accommodated in a flexible sheath 52. The flexible sheath 52 may be formed as an integral part of the second shell 36, e.g., in a 2K injection moulding process. The plunger when pushed downwards, may interact with a printed circuit board 54 arranged in the second compartment 16. The flexible sheath 52, the second shell 36, and the partition 12 may form the second compartment 16.

Figure 3B:
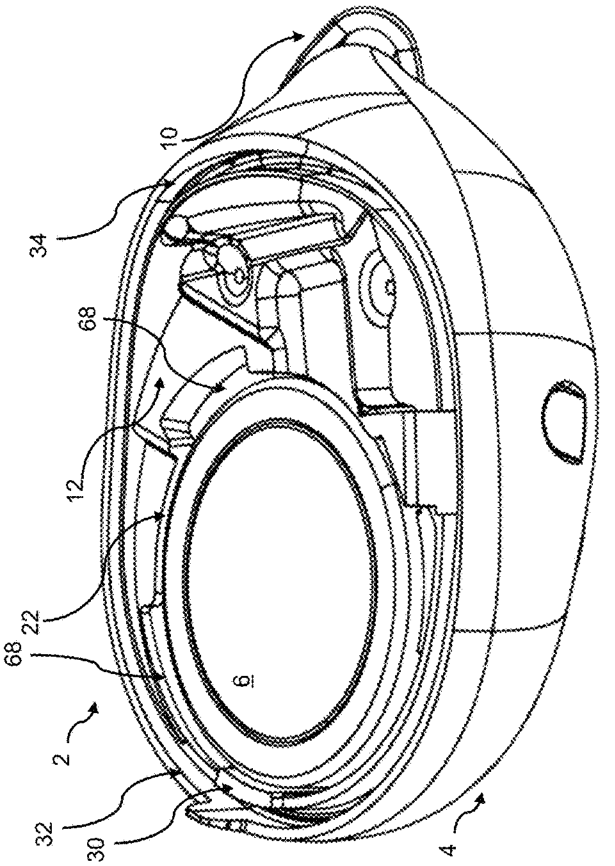
FIGS. 3*a* and 3*b* schematically illustrates a first shell and a partition of an exemplary hearing device.
Figure 3A:
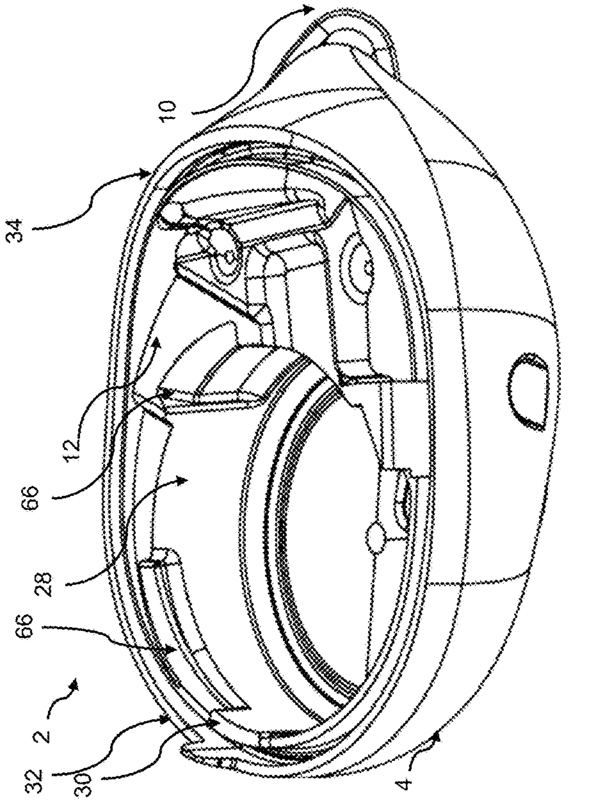

FIGS. 3*a* and 3*b* schematically illustrates a first shell 34 and a partition 12 of an exemplary hearing device 2. The hearing device 2 comprises a housing 4, at least a first electrical component 6 arranged inside the housing, which is exemplified as a battery in FIG. 3*b*. The hearing device 2 comprises a first opening 10 provided in the housing, where the first opening 10 is configured to provide passage from surroundings into the housing, wherein the first opening 10 is an opening 10 for the speaker. The hearing device 2 comprises a partition 12 arranged inside the housing 4. The partition 12 is configured to divide the housing 4 into at least a first compartment (not shown) and a second compartment (not shown), where the first opening 10 is provided in connection with the first compartment. The first electrical component 6, e.g. the battery, is shown to be arranged in a recess 28 of the partition 12, on the side of the partition 12 which is configured to form at least part of the second compartment.

The hearing device 2 may comprise a second opening, and the second opening is a microphone opening for a microphone (not shown) in the hearing device.

The partition 12 is shaped to at least partly accommodate at least a part of an outer surface 22 of the first electrical component 6 (battery).

The partition is shaped to comprise a recess 28 to at least partly accommodate at least a part of an outer surface 22 of the first electrical component 6 (battery).

An outer perimeter 30 of the partition 12 follows an inner perimeter 32 of the housing 4, where the inner perimeter 32 of the housing 4 is where the housing 4 is divided into the first compartment (not shown) and the second compartment (not shown).

The housing 4 comprises at least a first shell 34 and a second shell (not shown), wherein the first compartment (not shown) is defined by the first shell 34 and the partition 12, and wherein the second compartment may be defined by the second shell and the partition 12.

The first shell 34, the second shell and the partition 12 are configured to be assembled by snap fitting and an adhesive, where the snap fitting and the adhesive may be at the outer perimeter 30 of the partition 12 and the inner perimeter 32 of the housing 4, such as an inner perimeter of the first shell 34.

In FIG. 3*a*, the first shell 34 and the partition 12 is shown without the first electrical component 6. The partition 12 comprises one or more adhesive cavities 66 for receiving an adhesive for connecting the first electrical component 6 to the partition 12.

In FIG. 3*b*, the first shell 34 and the partition 12 is shown with the first electrical component 6 connected to the partition 12. The first electrical component 6 is connected to partition 12 via glue 68 being filled into the adhesive cavities 66.

Figure 4:
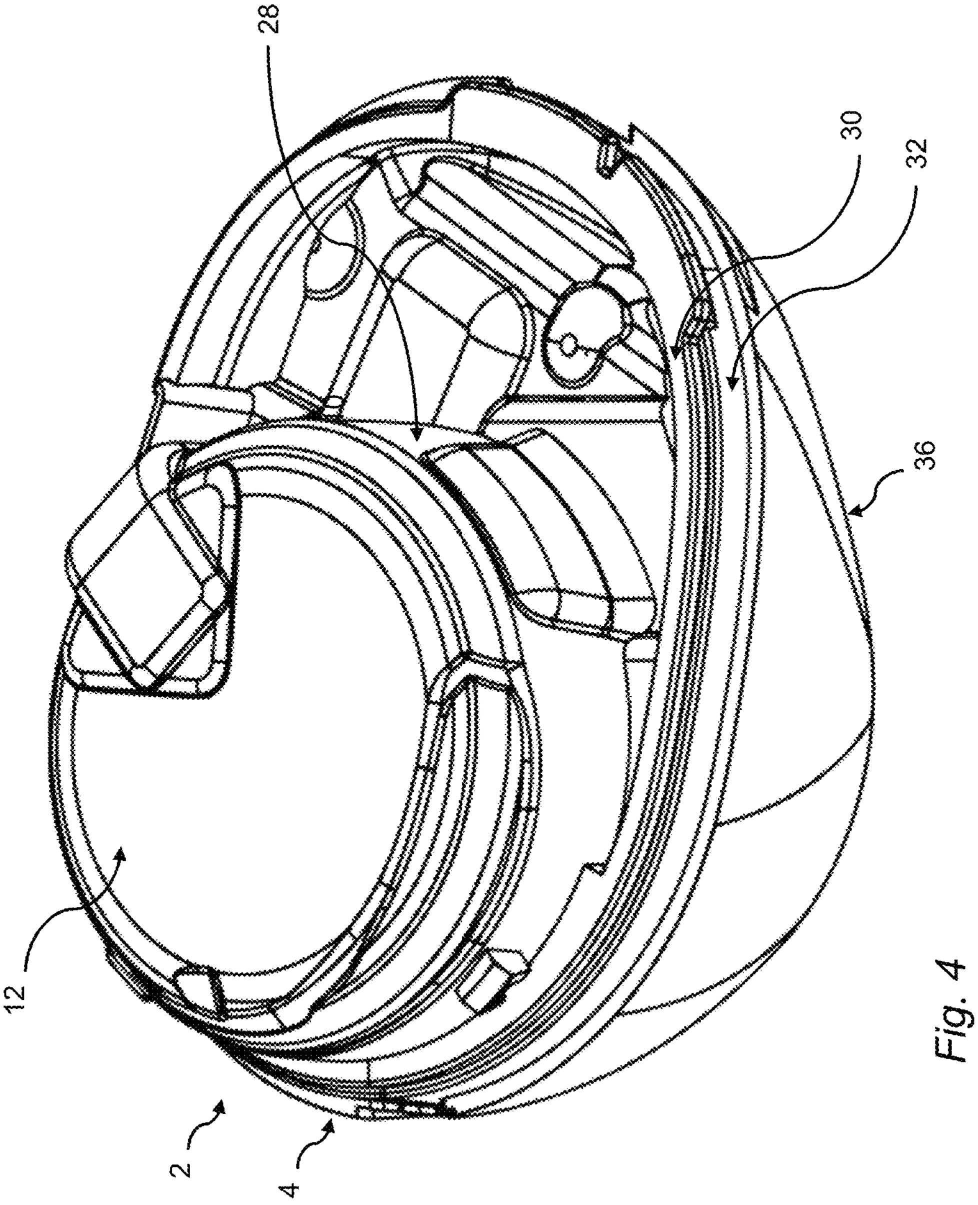
FIG. 4 schematically illustrates a second shell and a partition of an exemplary hearing device.

FIG. 4 schematically illustrates a second shell 36 and a partition 12 of an exemplary hearing device 2. The hearing device 2 comprises a housing 4, at least a first electrical component (not shown). The hearing device 2 comprises a partition 12 arranged inside the housing 4. The partition 12 is configured to divide the housing into at least a first compartment (not shown) and a second compartment (not shown). The first electrical component, e.g. the battery, is arranged in a recess 28 of the partition 12, on the side of the partition 12 which is configured to form at least part of the second compartment.

The partition 12 is shaped to at least partly accommodate at least a part of an outer surface of the first electrical component.

The partition 12 is shaped to comprise a recess 28 to at least partly accommodate at least a part of an outer surface of the first electrical component.

An outer perimeter 30 of the partition 12 follows an inner perimeter 32 of the housing 4, where the inner perimeter 32 of the housing 4 is where the housing 4 is divided into the first compartment (not shown) and the second compartment.

The housing 4 comprises at least a first shell (not shown) and a second shell 36, wherein the first compartment is defined by the first shell and the partition 12, and wherein the second compartment 16 is defined by the second shell 36 and the partition 12.

The first shell, the second shell 36 and the partition 12 are configured to be assembled by snap fitting and an adhesive, where the snap fitting and the adhesive may be at the outer perimeter 30 of the partition 12 and the inner perimeter 32 of the housing 4, such as an inner perimeter of the second shell 36.

Figure 5:
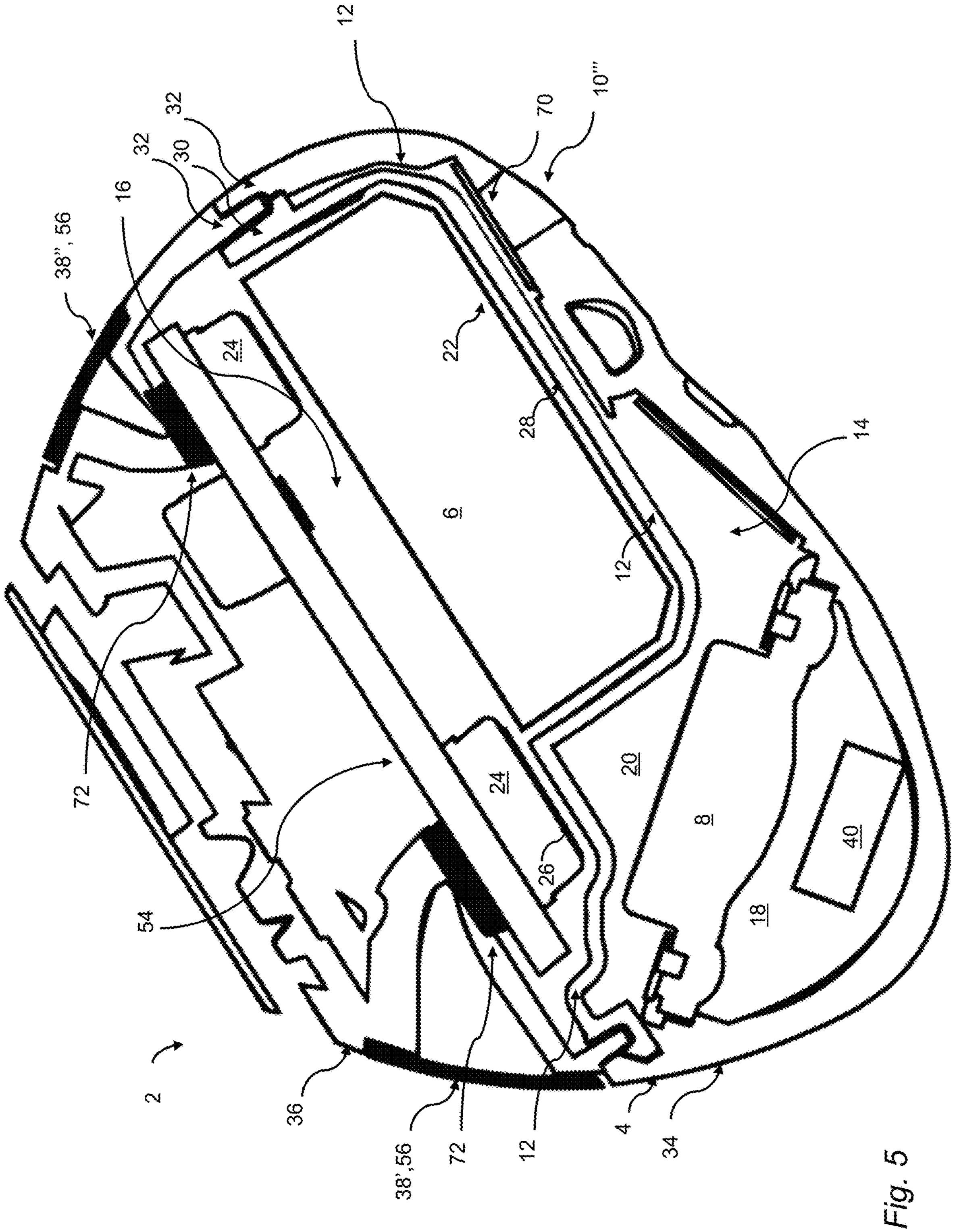
FIG. 5 schematically illustrates a cross section of a hearing device configured to be worn in an ear of a user.

FIG. 5 schematically illustrates a cross section of a hearing device 2 configured to be worn in an ear of a user. The hearing device 2 comprises a housing 4. The hearing device 2 comprises at least a first electrical component 6, e.g. a battery, arranged inside the housing 4. The hearing device 2 comprises a speaker 8 arranged in the housing 4. The hearing device 2 comprises a first opening 10''' provided in the housing, where the first opening 10''' is configured to provide passage from surroundings into the housing 4. In the shown example, the first opening 10''' is exemplified as a vent opening 10'''. The hearing device comprises second openings 38', 38'', and the second openings are microphone openings for the microphones 24 in the hearing device. The microphones 24 may be microphones for picking-up sound from an external environment. The first and second microphone openings 38', 38'' are shown to be covered by meshes 56. The meshes 56 may be acoustic meshes. The meshes 56 may be meshes for preventing dirt and other contaminants from affecting the performance of the microphones 24. The first opening 10''' is covered by a mesh 70 to prevent contaminants, such as liquids and dust, from entering the first compartment 14.

The hearing device 2 comprises a partition 12 arranged inside the housing 4. The partition 12 is configured to divide the housing 4 into at least a first compartment 14 and a second compartment 16. The first opening 10 is provided in the first compartment 14. The speaker 8 is arranged in the first compartment 14. The first electrical component 6, e.g. a battery, is arranged inside the second compartment 16. The partition 12 is arranged to seal the second compartment 16 from the first compartment 14. The partition 12 is configured to prevent water, liquids, sweat and/or moisture from passing from the first compartment 14 into the second compartment 16.

The first compartment 14 comprises a front cavity 18 of the speaker 8 and a back cavity 20 of the speaker 8. The partition is configured to fluidly seal the first electrical component 6 from the back cavity 20 of the speaker 8.

The partition 12 is shaped to at least partly accommodate at least a part of an outer surface 22 of the first electrical component 6.

The hearing device 2 comprises a second electrical component 24. The second electrical component 24 is arranged inside the second compartment 16. The partition 12 is shaped to at least partly accommodate at least a part of an outer surface 26 of the second electrical component 24. The second electrical component 24 may be a microphone.

The partition 12 is shaped to comprise a recess 28 to at least partly accommodate at least a part of an outer surface 22 of the first electrical component 6.

An outer perimeter 30 of the partition 12 follows an inner perimeter 32 of the housing, where the inner perimeter 32 of the housing 4 is where the housing 4 is divided into the first compartment 14 and the second compartment 16.

A thickness of the partition 12 may be in the range from 0.1 mm to 1.0 mm, such as in the range from 0.15 mm to 0.40 mm, such as in the range from 0.20 mm to 0.30 mm, such as 0.23 mm. The partition 12 may be made from a polymer material.

The housing 4 comprises at least a first shell 34 and a second shell 36. The first compartment 14 is defined by the first shell 34 and the partition 12. The second compartment 16 is defined by the second shell 36 and the partition 12.

The first shell 34, the second shell 36 and the partition 12 are configured to be assembled by snap fitting and an adhesive.

The hearing device 2 comprises second openings 38', 38". The second openings 38', 38" are provided in the second compartment 36. The second openings 38', 38" are microphone openings. The first electrical component 6 is fluidly sealed from the second openings 38', 38". Gaskets 72 may be arranged in connection with the second openings 38', 38" to thereby seal the first electrical component from the second openings 38', 38".

The hearing device 2 comprises a third electrical component 40. The third electrical component 40 is arranged inside the first compartment 14. The third electrical component 40 is a microphone.

The microphone 40 may be used for feedback active noise cancellation. The third electrical component 40 may be arranged in the front cavity 18 of the speaker 8.

Figure 6A:
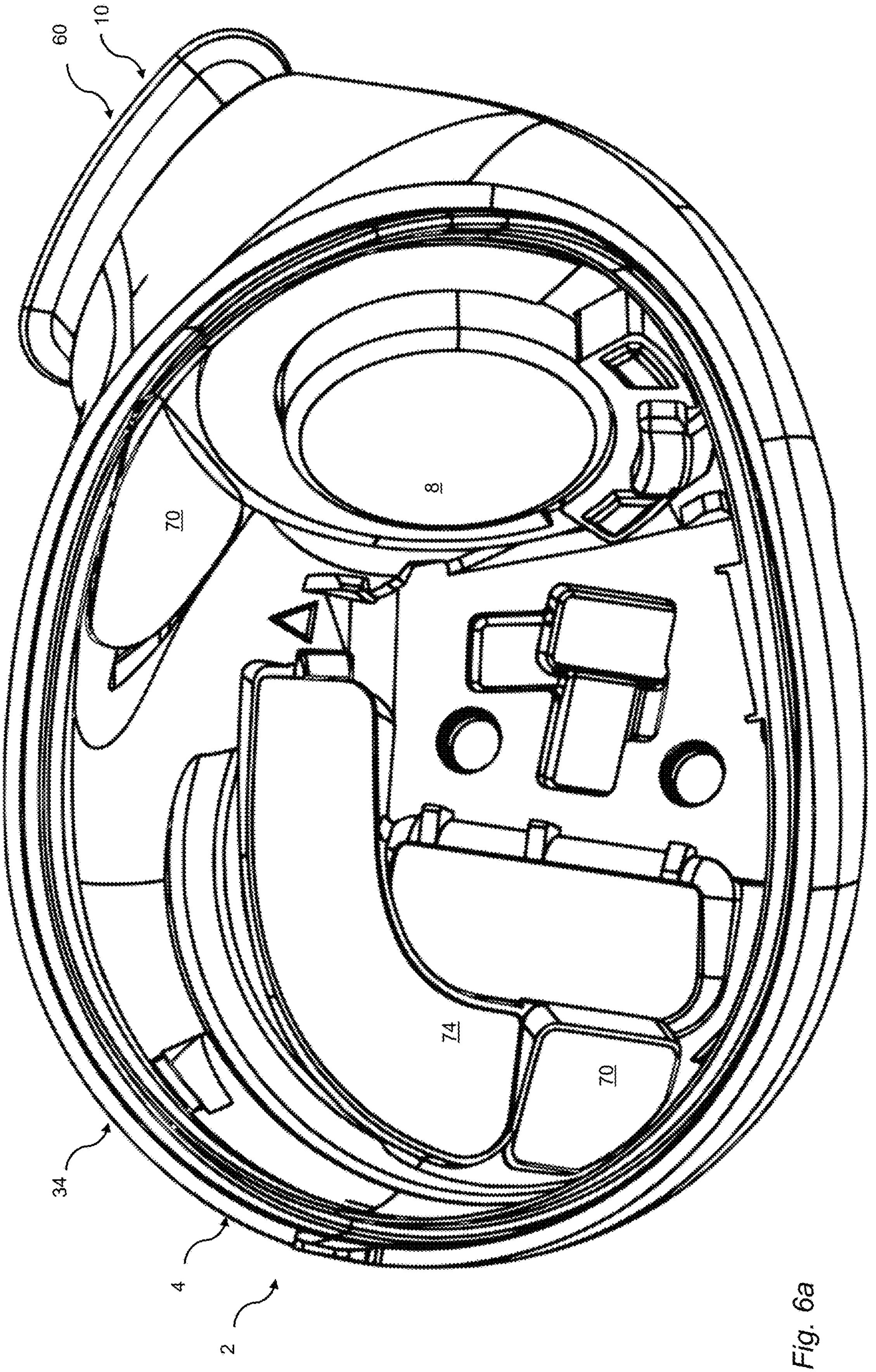
FIGS. 6*a* and 6*b* schematically illustrates a first shell of an exemplary hearing device.
Figure 6B:
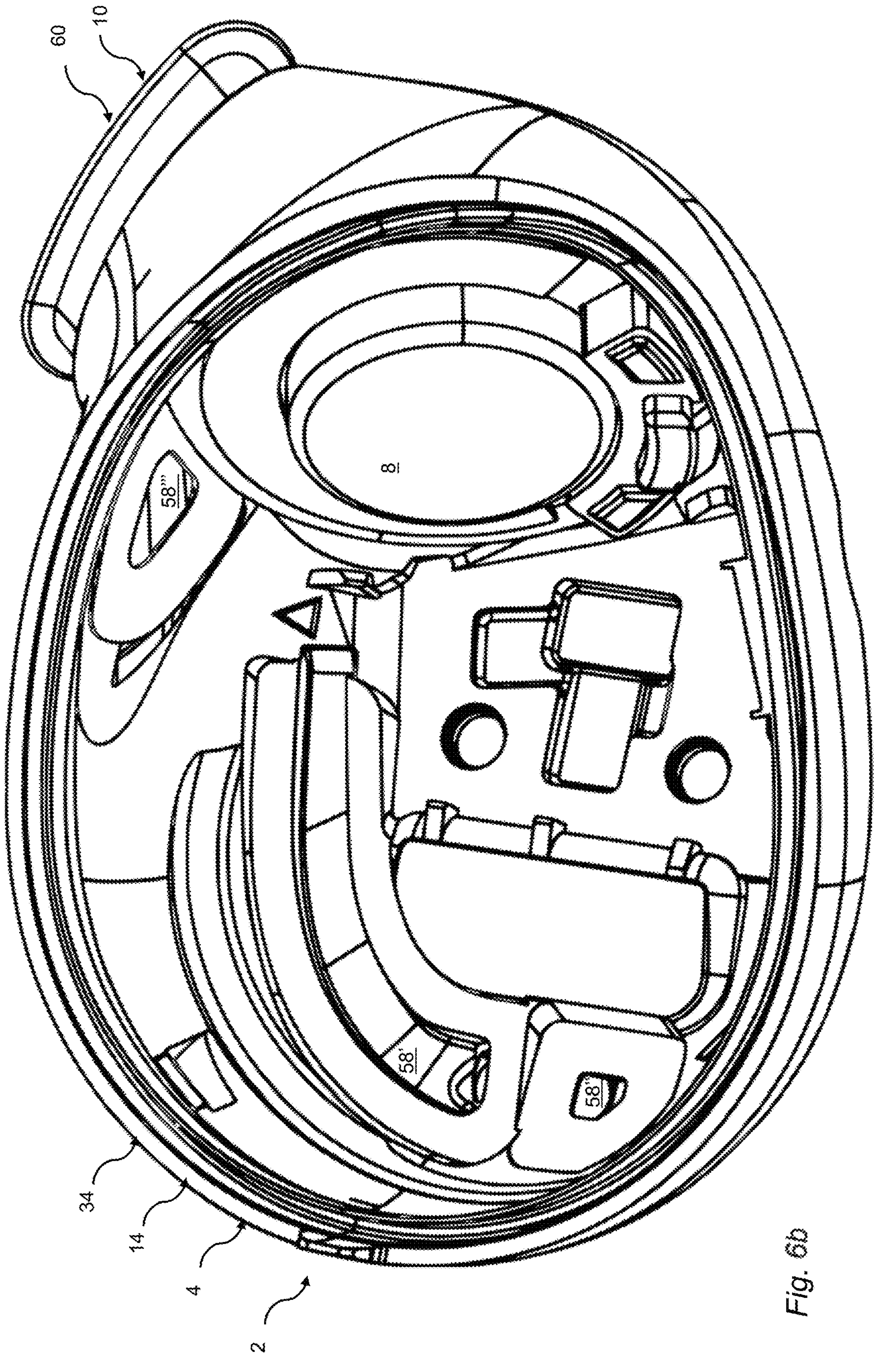

FIGS. 6*a* and 6*b* schematically illustrates a first shell 34 of an exemplary hearing device 2. A speaker 8 is arranged in the first shell 34. The hearing device 2 comprises a first opening 10 provided in the first shell 34. The first opening 10 is configured to provide passage from surroundings into a housing 4. The first opening 10 is an opening for the speaker 8. The first opening 10 for the speaker 8 is arranged in a speaker tower 60. The first shell 34 comprises an additional first opening configured to provide passage from surroundings into the housing 4. The additional first opening splits into a long vent 58' and a short vent 58". The long vent 58' and the short vent 58" provide passage between the back cavity of the speaker 8 and surroundings. The long vent 58' being formed by a groove in the first shell 34 and a cover piece 74 attached to the first shell 34. Both the short vent 58" and the long vent 58' may be covered by a mesh to prevent the ingress of dirt and liquid from the surroundings into the housing 4. In the shown example, only a mesh 70 is shown covering the short vent 58".

A mutual vent 58''' is formed in the first shell 34. The mutual vent 58''' connects the front cavity of the speaker 8 with the back cavity of the speaker 8. A mesh 70 is arranged covering the mutual vent 58''' to prevent dirt and liquid from passing between the front cavity and the back cavity.

Figure 7:
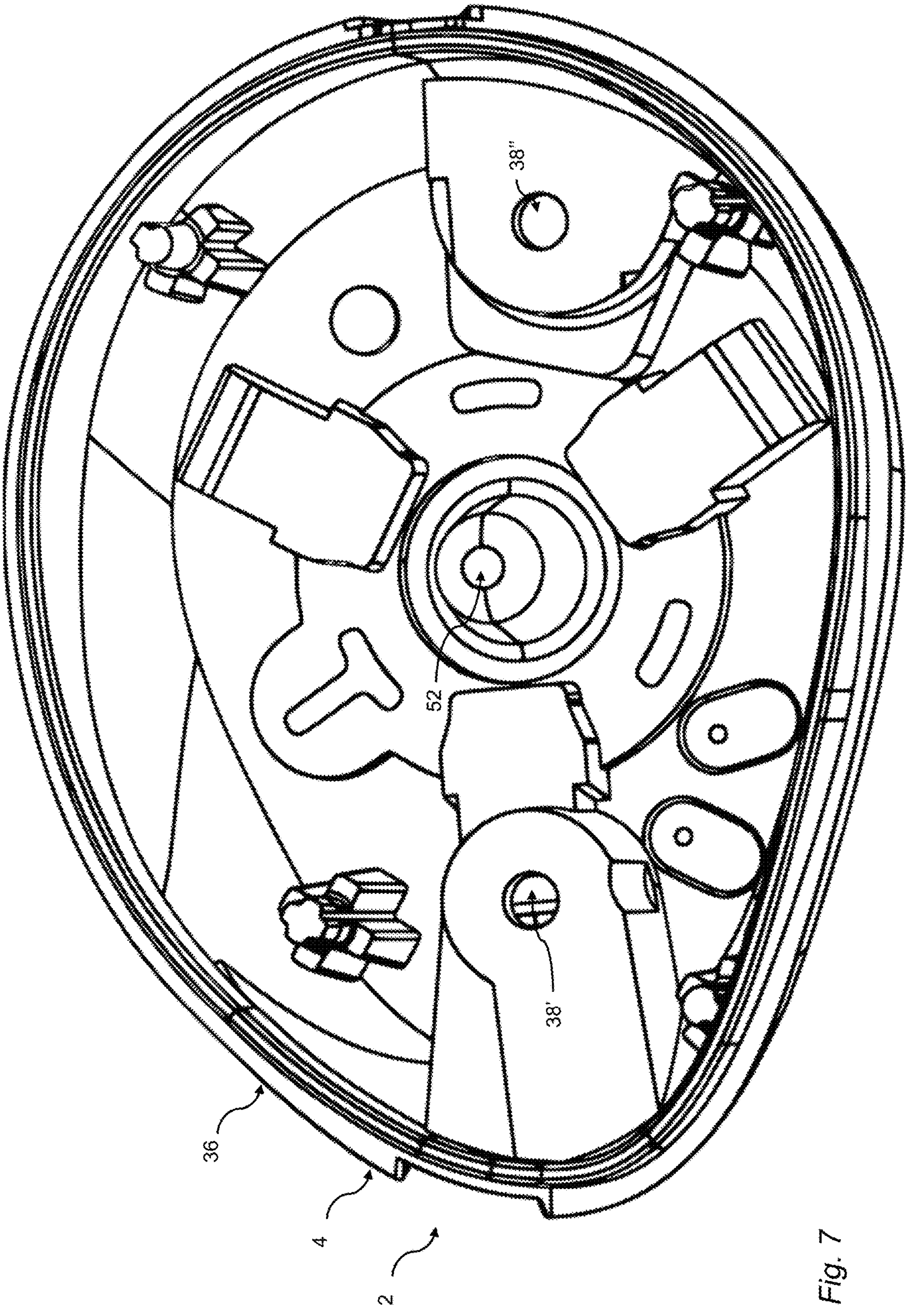
FIG. 7 schematically illustrates a second shell of an exemplary hearing device.

FIG. 7 schematically illustrates a second shell 36 of an exemplary hearing device 2. The hearing device 2 comprises second openings 38, 38'. The second openings 38, 38' are provided in the second shell 36. The second openings 38 are microphone openings, e.g., openings for a microphone inlet.

The hearing device 2 comprises a push button (not shown) which extends across a flat surface of the hearing device 2. The push button may be adjacent and align with edges of the second shell 36. The push button may, when pushed downwards, activate a plunger (not shown), and the plunger may then interact with a printed circuit board (not shown) arranged in the second shell 36.

A flexible sheath 52 for accommodating the plunger is provided in the second shell 36.

Figure 8:
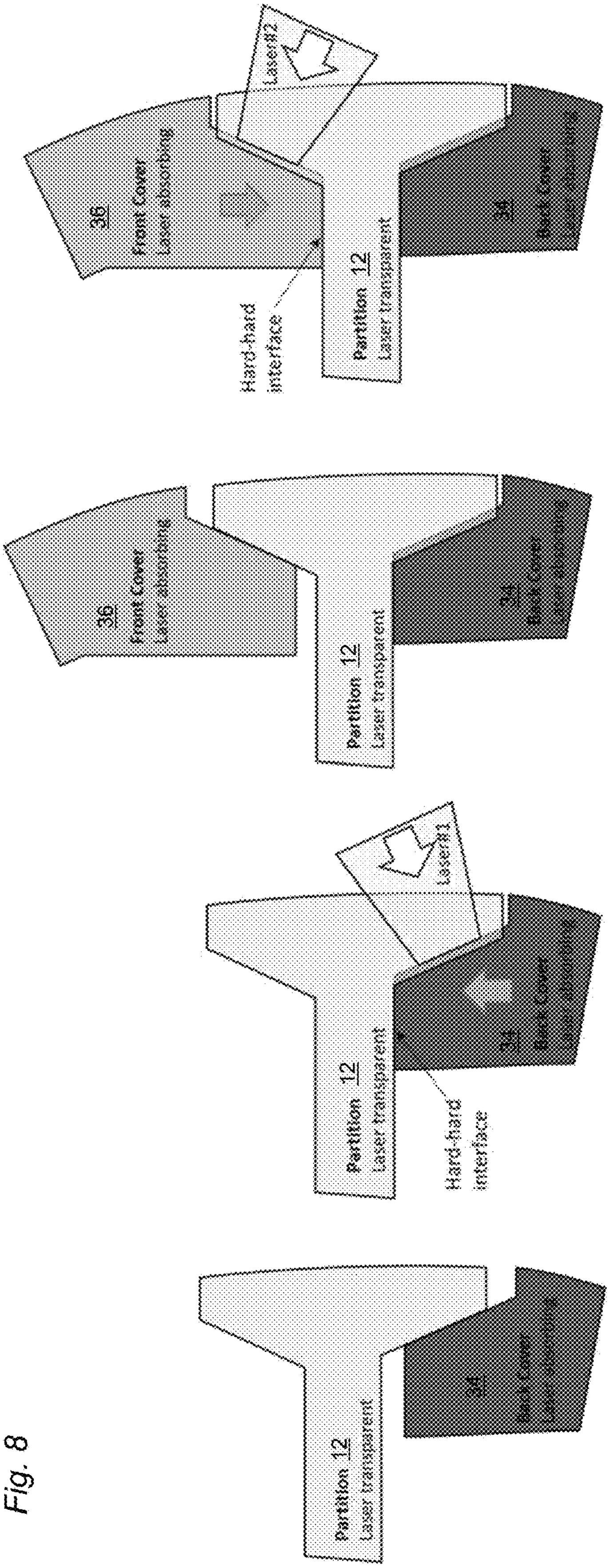
FIG. 8 schematically illustrates a method of assembling the hearing device.

FIG. 8 schematically illustrates a method 100 of assembling the hearing device. This method 100 uses laser welding for assembling the parts of the hearing device, however other assembly methods may be used, such as assembly using adhesive, assembly using snapfitting, mechanical fixation or a combination of these.

The method 100 comprises a step 102 of assembling the partition 12 to the first shell 34 (called back cover in the fig.), and then applying a clamping force.

The method 100 comprises a step 104 of keeping the clamping force and applying laser to laser weld the first shell 34 to the partition 12.

The method 100 comprises a step 106 of assembling the second shell 36 (called front cover in the fig.) onto the partition 12, and then applying a clamping force.

The method 100 comprises a step 108 of keeping the clamping force and applying laser to laser weld the second shell 36 to the partition 12.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A hearing device (2) configured to be worn in an ear of a user, the hearing device comprising:
   - a housing (4);
   - at least a first electrical component (6) arranged inside the housing;
   - a speaker (8) arranged in the housing;
   - a first opening (10) provided in the housing, where the first opening is configured to provide passage from surroundings into the housing, wherein the first opening is an opening for the speaker and/or a vent opening;
   - a partition (12) arranged inside the housing;

wherein the partition is configured to divide the housing into at least a first compartment (14) and a second compartment (16), where the first opening is provided in the first compartment, where the speaker is arranged in the first compartment, and where the first electrical component is arranged inside the second compartment;

wherein the partition is arranged to seal the second compartment from the first compartment;

wherein the partition is configured to prevent water, liquids, sweat and/or moisture from passing from the first compartment into the second compartment.

2. The hearing device according to any of the preceding items, wherein the first compartment (14) comprises a front cavity (18) of the speaker and a back cavity (20) of the speaker, and wherein the partition is configured to seal the first electrical component from the back cavity of the speaker.

3. The hearing device according to any of the preceding items, wherein the partition is configured to prevent liquids from passing from the first compartment into the second compartment thereby preventing corrosion in the second compartment, and wherein the partition is configured to prevent battery acid leaks from a battery in the second compartment from passing from the second compartment into the first compartment.

4. The hearing device according to any of the preceding items, wherein the partition is configured to control the size and/or the shape of the back cavity of the speaker in the first compartment, whereby improved sound is obtained in the hearing device.

5. The hearing device according to any of the preceding items, wherein the partition is shaped to at least partly accommodate at least a part of an outer surface (22) of the first electrical component.

6. The hearing device according to any of the preceding items, wherein the hearing device comprises a second electrical component (24), and wherein the second electrical component is arranged inside the second compartment, and wherein the partition is shaped to at least partly accommodate at least a part of an outer surface (26) of the second electrical component.

7. The hearing device according to any of the preceding items, wherein the partition is shaped to comprise a recess (28) to at least partly accommodate at least a part of an outer surface of the first electrical component.

8. The hearing device according to any of the preceding items, wherein an outer perimeter (30) of the partition follows an inner perimeter (32) of the housing, the inner perimeter of the housing being where the housing is divided into the first compartment and the second compartment.

9. The hearing device according to any of the preceding items, wherein a thickness of the partition is in the range from 0.1 mm to 1.0 mm, such as in the range from 0.15 mm to 0.40 mm, such as in the range from 0.20 mm to 0.30 mm, such as 0.23 mm.

10. The hearing device according to any of the preceding items, wherein the partition is made from a polymer material.

11. The hearing device according to any of the preceding items, wherein the housing comprises at least a first shell (34) and a second shell (36), wherein the first compartment is defined by the first shell and the partition, and wherein the second compartment is defined by the second shell and the partition.

12. The hearing device according to the preceding item, wherein the first shell, the second shell and the partition are configured to be assembled by snap fitting and an adhesive.

13. The hearing device according to any of the preceding items, wherein the hearing device comprises a second opening (38), wherein the second opening is provided in the second compartment, wherein the second opening is a microphone opening, and wherein the first electrical component is fluidly sealed from the second opening.

14. The hearing device according to any of the preceding items, wherein the first electrical component is a battery, a microphone, and/or a printed circuit board.

15. The hearing device according to any of the preceding items, wherein the hearing device comprises a third electrical component (40), wherein the third electrical component is arranged inside the first compartment, and wherein the third electrical component is an in-the-ear microphone.

LIST OF REFERENCES

2 hearing device
4 housing
6 first electrical components
8 speaker
10, 10''' first opening of housing
12 partition
14 first compartment
16 second compartment
18 front cavity of the speaker
20 back cavity of the speaker
22 outer surface of the first electrical component
24 second electrical component
26 outer surface of the second electrical component
28 recess of partition
30 outer perimeter of the partition
32 inner perimeter of the housing
34 first shell of housing
36 second shell of housing
38', 38" second opening of housing
40 third electrical component
42 push button
44 edges of housing
46 eargel
48 sheath
50 charging components
52 flexible sheath
54 printed circuit board
56 mesh at microphone opening
58' long vent
58" short vent
58''' mutual vent
60 speaker tower
64 sensor module
66 adhesive cavity
68 adhesive
70 mesh at vent opening
72 gasket for microphone opening
74 cover piece
100 method
102 method step of assembling parts
104 method step of clamping and applying laser
106 method step of assembling parts
108 method step of clamping and applying laser

The invention claimed is:

1. A hearing device configured to be worn in an ear of a user, the hearing device comprising:
a housing;
at least a first electrical component arranged inside the housing;
a speaker arranged in the housing;
a first opening provided in the housing,
wherein the first opening is configured to provide passage from surroundings into the housing, and
wherein the first opening is an opening for at least one of the speaker or a vent opening;
a partition arranged inside the housing;
wherein the partition is configured to divide the housing into at least a first compartment and a second compartment,
wherein the first opening is provided in the first compartment,
wherein the speaker is arranged in the first compartment,
wherein the first electrical component is arranged inside the second compartment, and
wherein the partition includes a snap fitting and an adhesive to fluidly seal the second compartment from the first compartment.

2. The hearing device according to claim 1,
wherein the first compartment comprises a front cavity of the speaker and a back cavity of the speaker, and
wherein the partition is configured to seal the first electrical component from the back cavity of the speaker.

3. The hearing device according to claim 1,
wherein the partition is configured to fluidly seal to prevent liquids from passing from the first compartment into the second compartment thereby preventing corrosion in the second compartment, and
wherein the partition is configured to prevent battery acid leaks from a battery in the second compartment from passing from the second compartment into the first compartment.

4. The hearing device according to claim 1, wherein the partition is configured to control the size and/or the shape of the back cavity of the speaker in the first compartment, whereby improved sound is obtained in the hearing device.

5. The hearing device according to claim 1, wherein the partition is shaped to at least partly accommodate at least a part of an outer surface of the first electrical component.

6. The hearing device according to claim 1, wherein the hearing device further comprises:

a second electrical component arranged inside the second compartment, and wherein the partition is shaped to at least partly accommodate at least a part of an outer surface of the second electrical component.

7. The hearing device according to claim 1, wherein the partition is shaped to comprise a recess to at least partly accommodate at least a part of an outer surface of the first electrical component.

8. The hearing device according to claim 1, wherein an outer perimeter of the partition follows an inner perimeter of the housing, the inner perimeter of the housing being where the housing is divided into the first compartment and the second compartment.

9. The hearing device according to claim 1, wherein a thickness of the partition is in the range from 0.1 mm to 1.0 mm, including one of a range from 0.15 mm to 0.40 mm, a range from 0.20 mm to 0.30 mm, or 0.23 mm.

10. The hearing device according to claim 1, wherein the snap fitting of the partition is made from a polymer material.

11. The hearing device according to claim 1, wherein the housing comprises at least a first shell and a second shell, wherein the first compartment is defined by the first shell and the partition, and wherein the second compartment is defined by the second shell and the partition.

12. The hearing device according to claim 11, wherein the first shell, the second shell and the partition are configured to be assembled by laser welding.

13. The hearing device according to claim 1, wherein the hearing device comprises a second opening, wherein the second opening is provided in the second compartment, wherein the second opening is a microphone opening, and wherein the first electrical component is fluidly sealed from the second opening.

14. The hearing device according to claim 1, wherein the first electrical component is at least one of a battery, a microphone, or a printed circuit board.

15. The hearing device according to claim 1, wherein the hearing device comprises a third electrical component, wherein the third electrical component is arranged inside the first compartment, and wherein the third electrical component is an in-the-ear microphone.

* * * * *